May 19, 1953   L. M. EVERETT, SR   2,638,961
METHOD OF PATCHING AUTOMOBILE INNER TUBES
Filed Oct. 23, 1950   2 Sheets-Sheet 2
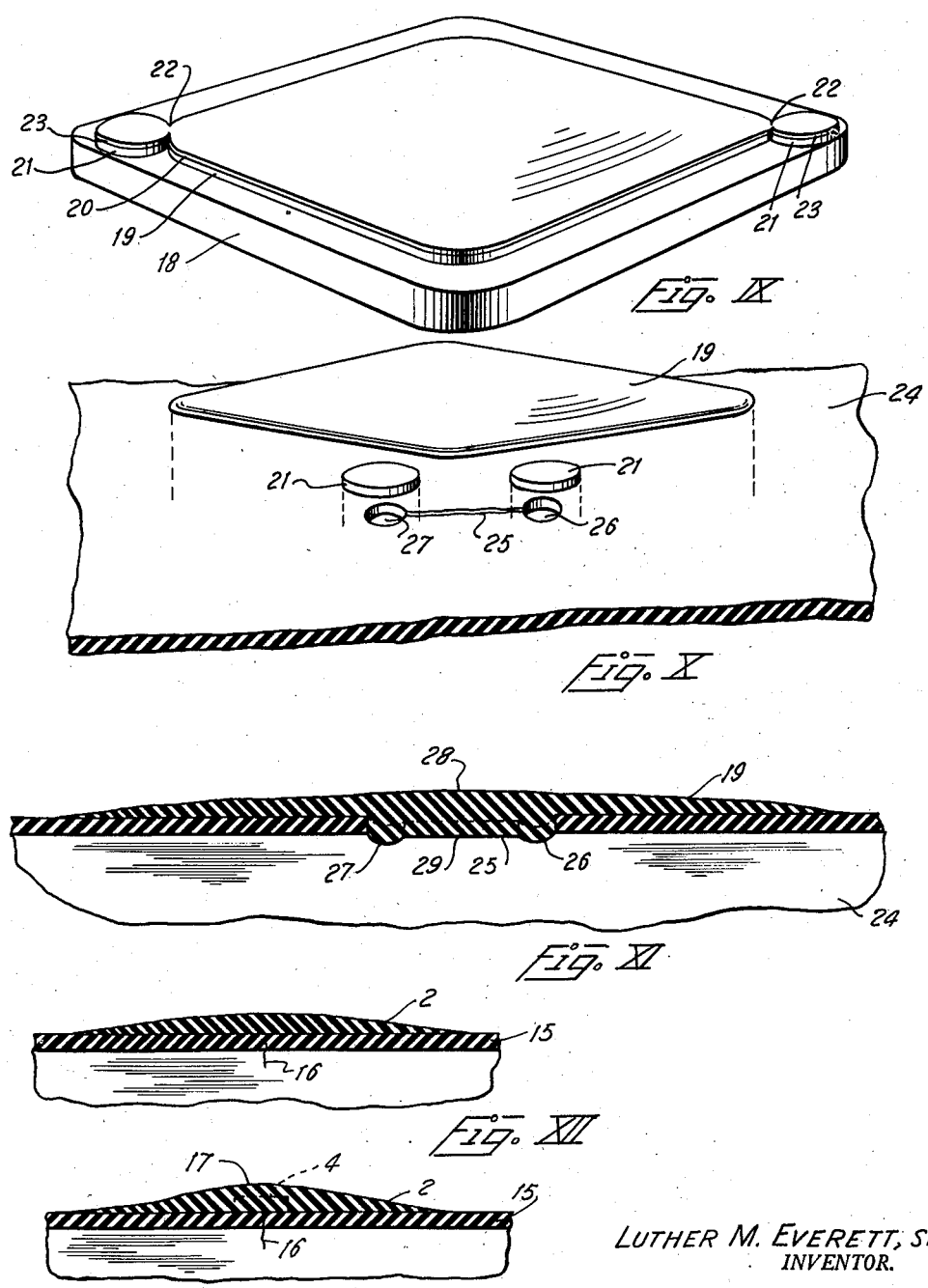
LUTHER M. EVERETT, SR
INVENTOR.
BY 
ATTORNEY Patented May 19, 1953

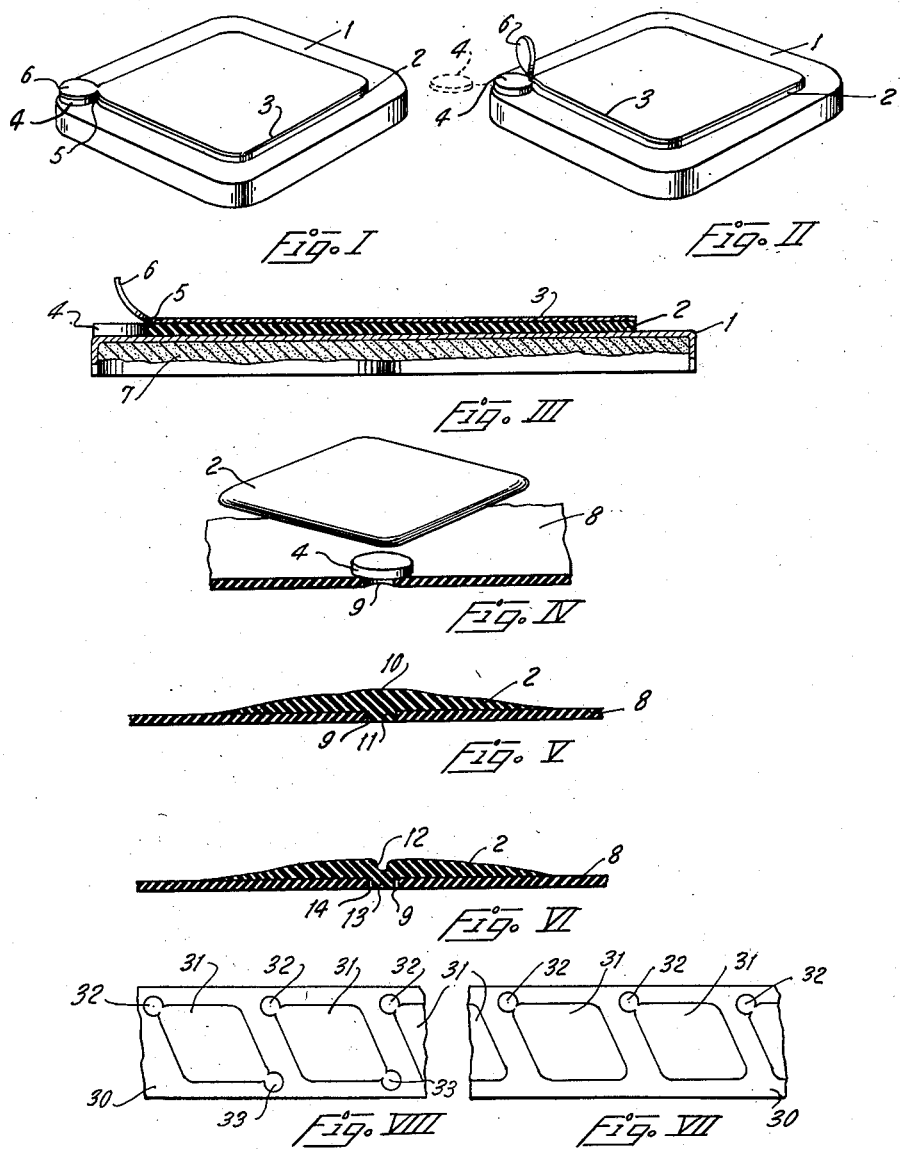

2,638,961

UNITED STATES PATENT OFFICE 2,638,961

METHOD OF PATCHING AUTOMOBILE INNER TUBES

Luther M. Everett, Sr., Dallas, Tex., assignor to Better Monkey Grip Company, Dallas, Tex., a corporation of Texas Application October 23, 1950, Serial No. 191,710

3 Claims. (Cl. 154—14)

This invention is concerned with the patching of automobile inner tubes and other rubber articles and is particularly concerned with the method of patching such articles by vulcanizing and a vulcanizing patch employed for such purpose.

Vulcanizing patches employed in the past have been marketed in packages containing a number of individual units, each unit being ready for application to an inner tube or other article of rubber material for the purpose of patching an opening, puncture or rupture in the rubber material.

Each patch unit comprises a metallic pan or platen on the under side of which is emplaced a fuel board made of a composition of paper pulp and chemicals which is easily ignitible and burns relatively slowly and evenly, without flame. On the opposite side of the pan from the fuel board is a piece of unvulcanized rubber patch material, which is relatively pliable and adherent and sticks to the metallic pan when pressed thereagainst. The outer side of the patch material is covered with a protective covering of Holland cloth. The Holland cloth is a relatively tough, stiff fabric material which has been specially treated to give it a smooth surface. It adheres to the rubber patch material, but may be easily removed therefrom by separating it from the patch material at one side and peeling it off.

In order to patch an inner tube or other rubber material with this type of patch the inner tube or other material is placed flat on a smooth, hard surface. The Holland cloth is peeled from the surface of the patch material. The patch material and the pan to which it is stuck, is placed over the hole, puncture or rupture in the material to be patched with the exposed patch material next to the surface being patched and the pan is clamped or pressed downwardly thereover so that the patch material is pressed firmly thereagainst. The fuel board is then ignited and as it burns the heat therefrom is radiated through the metal pan to the patch material and the surface being patched. The patch material is fused with the patched surface and is vulcanized thereto. The patch is then allowed to cool and the pan is removed therefrom. The vulcanizing process hardens and toughens the patch material, yet increases its elasticity.

If there be a hole or rupture in the patched surface which leaves an opening between the sides of the hole or rupture, the patch material will flow into the opening when it is heated and will leave an indentation in the patch material of lesser thickness than the remainder of the patch, thus weakening the patch at the point of greatest weakness. If the hole or rupture be relatively large, the amount of rubber from the patch material will be insufficient to completely fill the hole and the patch material which has thus run into the hole or rupture will not fuse and vulcanize with the sides thereof, thus further weakening the patch at the point of greatest weakness. A patch used on an automobile inner tube, having such point of weakness, is ineffective and presents the hazard of rupturing and breaking at such point with consequent danger of a blowout which could cause an accident.

My invention, among other objects, is intended to obviate the above recited undesirable results obtained in prior practice.

A primary object of my invention is to provide a method of applying a vulcanizing patch to an automobile inner tube or other rubber article wherein an extra piece of patch material is placed over a hole, puncture or rupture in such an article, the emplacement of patch material thereover, and the application of heat to the extra piece of patch material and the patch to thereby fuse the patch and the extra piece of material in and above the hole or rupture to form a thickened and strengthened area in the patch at the point of the hole or rupture.

Another important object of my invention is to provide a method of applying a vulcanizing patch to an automobile inner tube or other rubber article wherein an integral extension is provided on the patch body which may be removed without appreciably affecting the symmetrical contour of the patch, the removal of the extension from the patch body, the placing of the extension over a hole, puncture or rupture in an inner tube or other article, the placing of the patch body over the removed extension, and the application of heat to the patch and the removed extension to thereby cause the extension and the patch to fuse and flow into the hole or rupture and fuse with the side thereof and further provide a thickened portion of the patch at the point of the hole, puncture or rupture.

A further object of my invention is to provide a vulcanizing patch with an integral extension thereon, which may be removed for the purpose of using same as an extra amount of patch material over a hole, puncture or rupture in an inner tube or other rubber article.

Still another object of my invention is to provide a vulcanizing patch having an integral extension thereon which may be removed without appreciably changing the symmetrical shape of the patch.

A further object of my invention is to provide a vulcanizing patch with an integral extension thereon joined to the main body of the patch by a reduced neck portion to thus facilitate the removal of the extension, without appreciably changing the symmetrical shape of the patch body.

Another object of my invention is to provide an integral extension on a vulcanizing patch, such extension being joined on the main body of the patch by a reduced neck portion, the patch and the extension thereon being covered with a continuous piece of protective covering so that when the extension is removed, a tab of protective covering remains at the place of removal which tab provides an overhanging integral extension of the covering material for the main body of the patch, so that such tab may be easily grasped for removal of the protective covering from the main body of the patch.

A further object of my invention is to provide a vulcanizing patch with two of such filler plugs or extensions thereon whereby two filler plugs may be provided for the purpose of filling extra large holes or splits in an inner tube or other rubber article.

A still further object of my invention is to provide a method of patching an elongated split in an inner tube or other rubber article which comprises the making of a hole at each end of the slit and the placement over each of said holes of an extra piece of patch material, the placing of a patch thereover and the application of heat thereto, thereby fusing the patch with the extra pieces of patch material and causing the fused patch material to run into the holes and into the split and become vulcanized to the sides thereof, and further provide an extra thickness of patch material over the patched split.

Other and further objects of my invention will become apparent upon reading the detailed specification hereinafter following, and by referring to the drawings.

Suitable devices for practising my invention are shown in the drawings, together with other illustrations making clear the practice and advantages of my invention.

In the drawings:

Fig. I is a perspective view of a vulcanizing patch assembly having a detachable filler plug extension thereon.

Fig. II is a perspective view of the vulcanizing patch assembly shown in Fig. I, showing the manner of removal of the detachable filler plug therefrom, and the extension tab of protective covering remaining after the removal of the filler plug.

Fig. III is an enlarged cross-sectional elevational view of the vulcanizing patch assembly shown in Figs. I and II.

Fig. IV shows a fragmentary sectionalized perspective of an inner tube or other article being patched, showing the manner of application of the filler plug and the patch.

Fig. V shows a fragmentary cross-sectional elevational view of an inner tube or other article, after the filler plug and patch have been vulcanized thereto to patch a hole therein.

Fig. VI is a fragmentary cross-sectional elevational view of an inner tube or other article showing the result of applying a conventional vulcanizing patch thereto without placing a filler plug over the hole in the tube before applying the patch.

Fig. VII is a fragmentary plan view of a continuous strip of patch material showing the manner of cutting patches therefrom with a single filler plug thereon.

Fig. VIII is a fragmentary plan view of a continuous strip of patch material showing the manner of cutting patches therefrom with two filler plugs thereon.

Fig. IX is a perspective view of a modified form of vulcanizing patch assembly having a filler plug on diametrically opposite corners thereof.

Fig. X is a fragmentary sectionalized perspective view of an inner tube or other article showing the manner of application of the form of patch shown in Fig. IX.

Fig. XI is a fragmentary cross-sectional view of an inner tube or other like article showing a patch thereon after it has been applied in the manner shown in Fig. X.

Fig. XII is a fragmentary cross-sectional view of an inner tube or other article after a conventional vulcanizing patch has been applied over a small puncture therein.

Fig. XIII is a fragmentary cross-sectional view of an inner tube or other article after a vulcanizing patch has been applied over a small puncture therein employing my method of placing a filler plug over the puncture before applying the patch.

Numeral references are employed to designate the various parts shown in the drawings and like numerals are used to designate like parts in the various figures of the drawings.

The numeral 1 designates a metallic pan or platen. The rubber patch material 2 is a relatively pliable, soft and sticky unvulcanized rubber, so that when pressed against the pan 1 it adheres thereto but is readily removable therefrom.

The upper surface of the patch body 2 is covered and protected by a protective covering of Holland cloth 3, previously described, which adheres to the patch material when pressed thereagainst, but may be easily removed therefrom in the manner hereinafter described.

An integral extension 4 of patch material is provided on one corner of the patch material 2. Such extension is sometimes referred to herein as a filler plug. This extension is shown as being substantially round, but of course, it may be of any shape. The extension or filler plug 4 is integrally joined to the patch material 2 by means of a relatively narrow extension or neck as indicated by the numeral 5.

The filler plug 4 is covered by a protective covering of Holland cloth 6, which covering 6 is integrally joined with the protective covering 3 on the patch material 2.

A layer of fuel board 7 is provided within the pan 1, underneath, and adjacent to, the under side of the top of the pan, such fuel board covering the entire under surface of the pan. The fuel board 7 is customarily made of a composition of paper pulp and chemicals and is readily ignitible and burns evenly without flame.

In the employment of the above described vulcanizing patch assembly in the practice of my method of patching an inner tube or other rubber article, the inner tube or other rubber article to be patched is placed upon a smooth, firm surface, and the filler plug 4 is removed from the main body of patch material 2. The filler plug may be easily separated from the pan 1 and the extension of Holland cloth 6 by grasping the pan and placing the point of the thumb nail over the joinder neck 5 and pressing downward thereagainst. This will ordinarily cause the filler plug 4 to separate from the surface of the pan and rise upwardly, and the further pressure with the thumb nail will spread and thin the neck 5 to facilitate the severance of the filler plug 4 from the patch material 2. By pulling outwardly and to the left on the filler plug, as shown in broken lines in Figure II, it may be disengaged from the Holland cloth extension 6, and from the patch material 2.

Of course this is merely a suggested manner of removal of the filler plug and one which has been found to be easily performed. It can be removed in any desired manner as by lifting up on the filler plug pinching it off and pulling it away from the Holland cloth extension tab 6. By providing the reduced neck joinder 5 the filler plug may be removed from the patch material 2 without appreciably changing the symmetrical contour of the patch material.

After the removal of the filler plug 4 the Holland cloth extension 6 remains and forms a tab of Holland cloth extending beyond the edge of the patch material 2. Such tab extension provides a convenient point for easily grasping and removing the Holland cloth from the patch material 2.

After the filler plug 4 has been removed in the manner hereinbefore recited it is placed over the hole, puncture or rupture in the material 8 to be patched, such as the hole 9 shown in Fig. IV. The patch material 2 and the pan to which it is attached, is then placed over the filler plug with the patch material adjacent thereto and the pan is clamped or pressed downwardly thereover.

The fuel board is then ignited and the pan is heated sufficiently to cause the filler plug 4 and the patch 2 to fuse and the patch material of the filler plug will flow into and fill the hole 9. The patch material will be fused to the surface being patched and to the sides of the hole. A thickened portion 10 is formed by the fusing of the patch and the filler plug directly over the hole and the extra patch material provided by the filler plug is sufficient to completely fill the hole 9 and fuse with the sides thereof, as shown at 11. Thus the patch is given extra strength at the point of greatest weakness.

In the absence of the use of the filler plug in the manner hereinbefore described, the patch material would flow into the hole 9 and leave a recess or indentation 12 directly over the hole, and if the hole were relatively large the portion of the patch material 13 flowing into the hole would be insufficient to fill the hole and would not be fused with the side of the hole, thus leaving an opening 14 between the portion 13 and the side of the hole. When a tube thus patched is inflated the hole is enlarged and opening 14 is increased in width, allowing pressure to be exerted through the opening 14 against the weakened point 12 of the patch, thus increasing the likelihood of a blowout or rupture of the tube at such point.

It is good practice in the use of my method and patch to make a hole large enough at the point of puncture or blowout so that the patch material of the filler plug will be allowed to run into the hole and be fused with the side thereof, thus making a stronger patch. However this method may be employed without making such a hole in the tube or other material, and may be applied over a small puncture where no appreciable amount of rubber has been displaced, as shown in Fig. XIII. If so applied, the fusing of the patch material 2 and the filler plug 4 placed over the puncture 16 will provide an extra thickness 17 of patch material at the point of the puncture, which assures against the patched material being weakened, blown out, or ruptured at that point.

By way of contrast, Fig. XII shows a conventional vulcanizing patch placed over the puncture 16 wherein a filler plug was not employed. It will be noted in this figure that the patch is not thickened, or strengthened over the puncture as it is in Fig. XIII.

In Figs. IX, X and XI is shown a modified form of vulcanizing patch assembly and the method of using same in the practice of my method. This form of patch is particularly adapted for use in patching a large hole or long split in an inner tube, wherein an extra amount of filler material is needed to fill the hole or split. Ordinarily it is made larger than the other form shown, but of course it could be made of any size.

In this form a pan 18, which is exactly the same in construction, as the pan 1, is provided, with a fuel board like that shown at 7 arranged underneath the top thereof. The patch material 19 is positioned on top of the pan 18 and such patch material is covered with a Holland cloth protective covering 20.

Filler plugs 21 are integrally attached to diametrically opposite corners of the patch material 19 by means of reduced neck portions 22.

The filler plugs 21 are covered by Holland cloth protective coverings 23, such protective coverings being integral with, and an extension of, the protective covering 20 on the main body portion 19 of the patch material.

The filler plugs 21 may be removed in the same manner as the filler plug 4, previously described and when so removed leave the tab extensions of Holland cloth 23 which provide overhanging extensions of the Holland cloth 20 so that it may be easily grasped and removed from the patch material 19. The removal of the filler plugs 21 at the necks 22 do not appreciably change the symmetrical shape of the patch material.

In Figs. X and XI is shown the method of applying the modified form of patch. As shown, the segment 24 of inner tube or other material to be patched has an elongated split 25 therein.

Before applying the filler plugs and the patch, it is good practice to make holes 26 and 27 at each end of the split 25, so that the patch material from the filler plugs 21 may flow into the holes and fuse with the rubber of the sides thereof, when heat is applied thereto. The patched material is thus strengthened and reinforced at the ends of the split and eliminates the tendency of the split to spread and become enlarged. However, the filler plugs could be applied over the split 25 without providing the holes 26 and 27. It has been found that a stronger patch is attained by providing the holes.

After the split has been so conditioned for applying the patch, the material 24 to be patched is placed on a flat, firm surface, the filler plugs 21 are removed from the patch material 19, and a filler plug is placed over each hole 26 and 27. The patch material 19, with the pan attached thereto, is then placed over the filler plugs and the split with the patch material adjacent to the surface being patched, the pan 18 is secured thereover and the fuel board is ignited. The heat from the fuel board radiates through the pan and fuses the filler plugs and the patch material 19 which flows into the holes 26 and 27 and the split 25 and becomes fused with the rubber of the material being patched. A thickened portion 28 is formed over the patched rupture, thus adding extra strength to the patch at such point.

The above described method of repair, employing the modified form of patch assembly, is particularly useful in patching that part of an inner tube which contacts the rim or wheel. At such place the tube is subject to damage from rim rust, and the application of tire tools. Such types of injury weaken the tube and the tube often splits when it is stretched by inflation into the well or channel of the rim or wheel. A great percentage of tube failures occur on the rim side, and such failures often result in elongated splits. Such splits may be more effectively repaired and prevented from spreading by employing my method and patch assembly.

My modified form of patch can also be advantageously used for patching an extra large hole in an inner tube or other rubber material, by placing two filler plugs 21 over the hole to provide sufficient extra patch material to fill the hole and thicken and strengthen the patch thereover.

The shapes of the pan, filler plugs, and patch illustrated in both forms of the patch assembly illustrated for carrying out my method are merely preferred shapes, and it is to be understood that the patch, pan, and filler plugs may be made in any desired shape and dimensions without departing from the spirit and scope of my invention.

The patches, with a filler plug or plugs thereon, may be cut from a continuous strip of patch material 30 as shown in Figs. VII and VIII. The fastest and most economical method of cutting the patches is to provide a long strip of patch material 30 with a Holland cloth covering thereon wound about a reel. By mechanical means the strip of patch material 30 is unwound from the reel and run under a die which reciprocates up and down and cuts the patches 31 and the integral filler plug 32 in a continuous sequence.

The die may also be formed to cut a filler plug 33 at the diametrically opposite corner of the patch from the filler plug 32 for the purpose of making a patch in accordance with the modified form shown herein. This is shown in Fig. VIII.

By employing the shapes of dies shown in Figs. VII and VIII the piece of patch material 30 need be only slightly wider than the patch in order to provide sufficient material at the corners of the patch for cutting the filler plugs, so that there is very little wastage of material in the provision of the filler plug or plugs. Of course the filler plugs could be cut on any side of the main body portion of the patch and still accomplish the same purpose.

The patches shown herein could be cut by hand or by other means, but obviously it is more economical and faster to cut them with a die out of a continuous strip of material passed underneath the die by machinery, in the manner described.

Likewise, the method of applying a vulcanizing patch, as disclosed herein, could be practiced, without employing the forms of the patch shown herein.

For instance, the filler plug could be provided separately from the patch and applied in the same manner as herein described.

The vulcanizing patch assemblies in the forms disclosed are preferred because they provide filler plugs of extra patch material removably and integrally joined to the patch by a reduced neck portion so that the whole assembly may be conveniently and compactly packaged; the filler plugs, being pre-cut of convenient size and shape ready for application when removed, yet upon the removal the size and contour of the patch is not changed; and tab extensions of protective covering are left to facilitate the removal of the protective covering from the patch.

Generally it may be stated that my invention includes methods and materials whereby a puncture, cut, rent, or break in a flexible plastic member, article or sheet may be repaired, closed, sealed and strengthened by providing a plurality of integrally attached thermoplastic bodies of which one such body is a primary body and greatly exceeds in size the one or more so attached smaller bodies, the cross-sectional area of attachment being materially less than the diameter of any such smaller body, and providing a common protective cover of integral character for all such bodies, the cover being removable from the face of the bodies so as to expose a clean fresh surface on such bodies, and the cover being so designed, shaped and arranged that upon the detachment therefrom of a smaller body and upon the detachment of such smaller body from the primary body there will be left a tab member extending beyond the contour of the primary body whereby the removal therefrom of the entire cover may be facilitated; and upon the placement of a detached small body in and/or over a rent or aperture in the member to be mended, and the further placement of the lately exposed surface of the primary body in immediate contact with the said small body and the said member, and the heating of all three members in such contact fusion therebetween may be effected to permanently close the opening and strengthen and repair the member.

I claim:

1. The method of patching an automobile inner tube or other rubber article comprising, the provision of a patch body having an integral extension of patch material thereon; the removal of the integral extension from the patch body; the placing of the removed extension over a hole, puncture or rupture in the surface to be patched; the placing of the patch body over the removed extension; and the application of heat to the patch and the removed extension sufficient to cause them to fuse and to become fused to the surface being patched, to thereby provide a thickened and strengthened portion of the patch over and in the hole, puncture or rupture.

2. The method of patching an elongated split in an inner tube or other rubber article comprising, the making of a hole at each end of the split, the placing over each of said holes of an extra piece of patch material; the placing of a patch thereover; and the application of heat thereto sufficient to fuse the patch with the extra pieces of patch material and to fuse the patch material to the surface being patched and to the side of the holes and split.

3. The method of effecting the closure of a rent in plastic material comprising the provision of a pair of integrally attached bodies of thermoplastic material of greatly dissimilar size under a continuous cover; the detachment of the smaller body from the larger body and from the cover, the placing of the smaller body immediately over the rent, the removal of the cover from the larger body so as to leave a clean exposed surface thereon, the placing of the larger body immediately over the smaller body with such surface in immediate contact with the last named body and the plastic material to be mended, and the heating of the three members so in contact until fusion is effected therebetween.

LUTHER M. EVERETT, Sr.

(References on following page)

References Cited in the file of this patent

UNITED STATES PATENTS

| Number | Name | Date |
|---|---|---|
| 931,056 | Glanz | Aug. 17, 1909 |
| 1,158,108 | Conley | Oct. 26, 1915 |
| 1,163,629 | Low | Dec. 7, 1915 |
| 1,899,676 | Dettling | Feb. 28, 1933 |
| 2,126,771 | Hanson | Aug. 16, 1938 |
| 2,503,511 | Rowe | Apr. 11, 1950 |
| 2,582,771 | Cornell | Jan. 15, 1952 |

FOREIGN PATENTS

| Number | Country | Date |
|---|---|---|
| 26,706 | Great Britain | 1910 |
| 572,341 | Great Britain | Oct. 3, 1945 |
| 679,341 | France | Jan. 6, 1930 |

OTHER REFERENCES

"Lucite" Manual by Du Pont, November 1942, pages 73–78.